April 10, 1945.     A. R. ROGOWSKI     2,373,262
DYNAMOMETER
Original Filed June 6, 1941     4 Sheets-Sheet 2
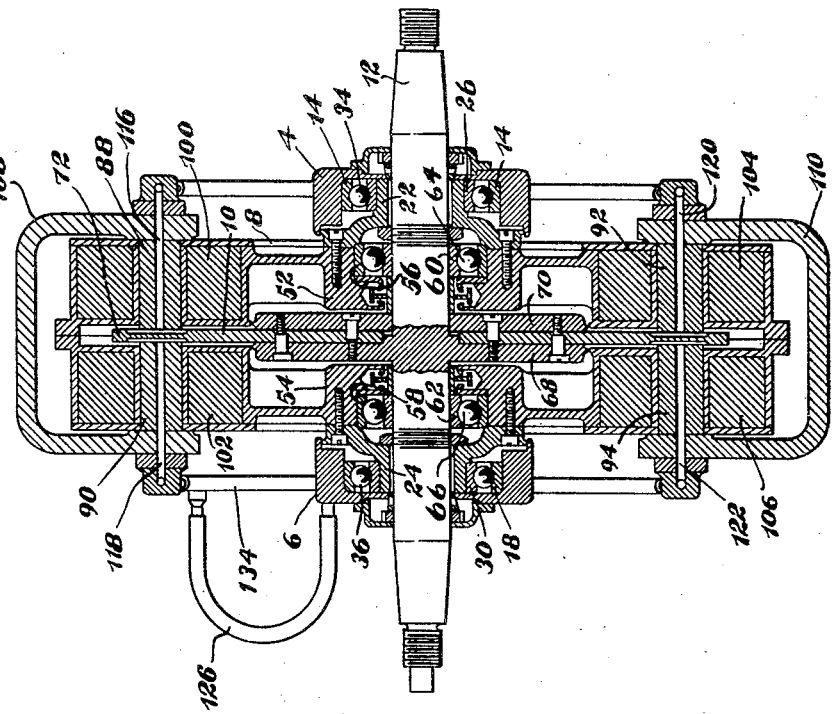
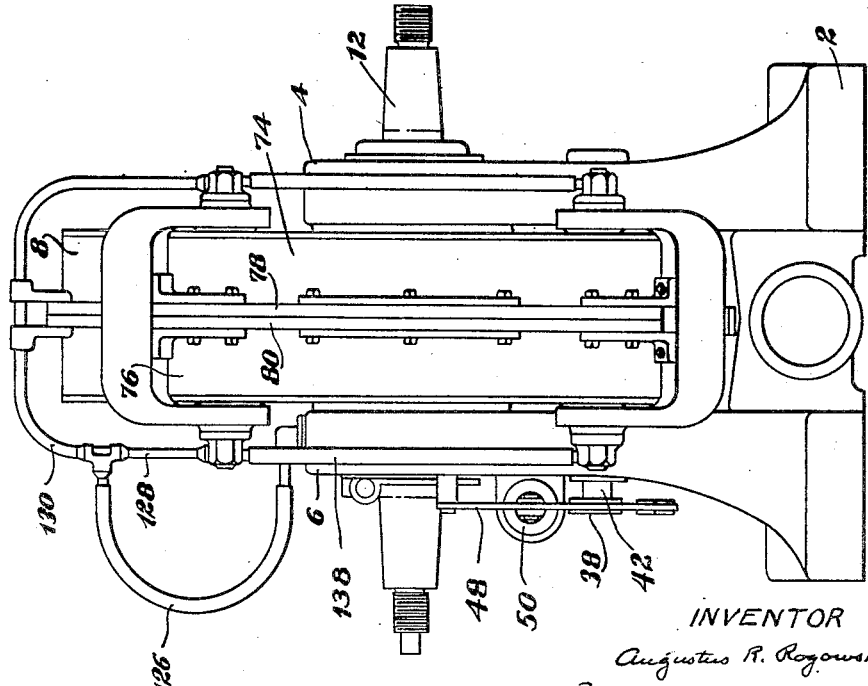
INVENTOR
Augustus R. Rogowski
By Yardley Chittick April 10, 1945.   A. R. ROGOWSKI   2,373,262
DYNAMOMETER
Original Filed June 6, 1941   4 Sheets-Sheet 3
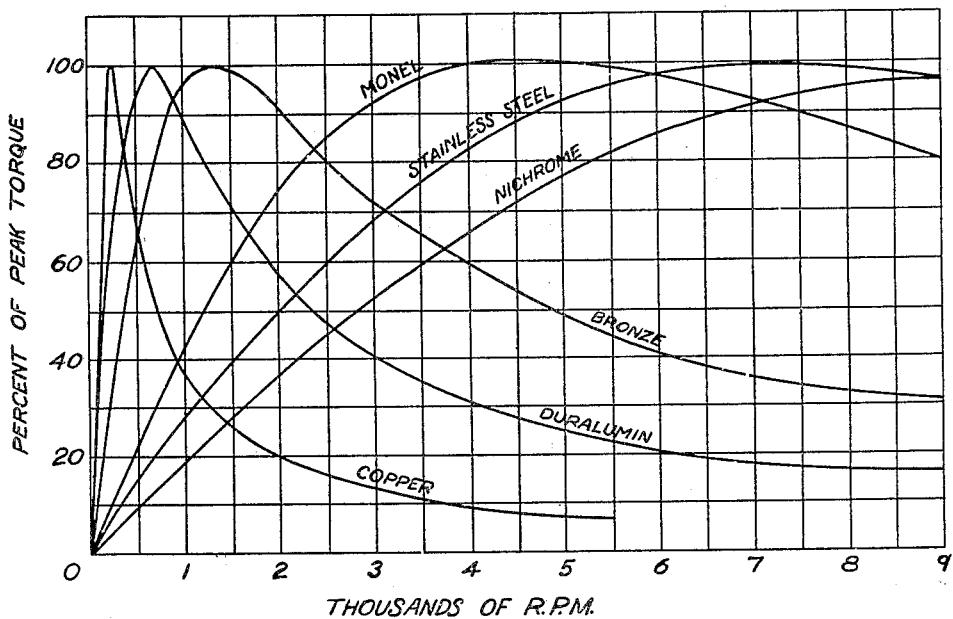
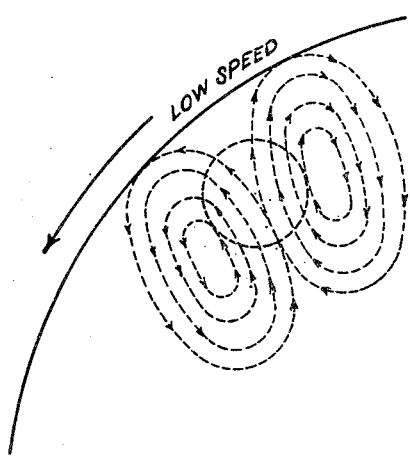
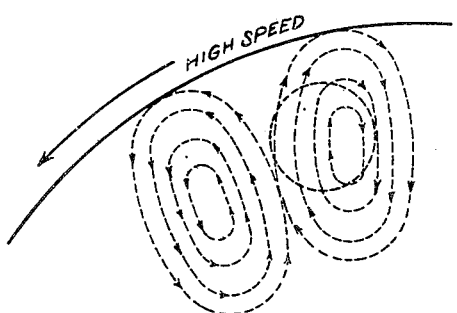
INVENTOR
Augustus R. Rogowski
By C. Yardley Chittick Patented Apr. 10, 1945

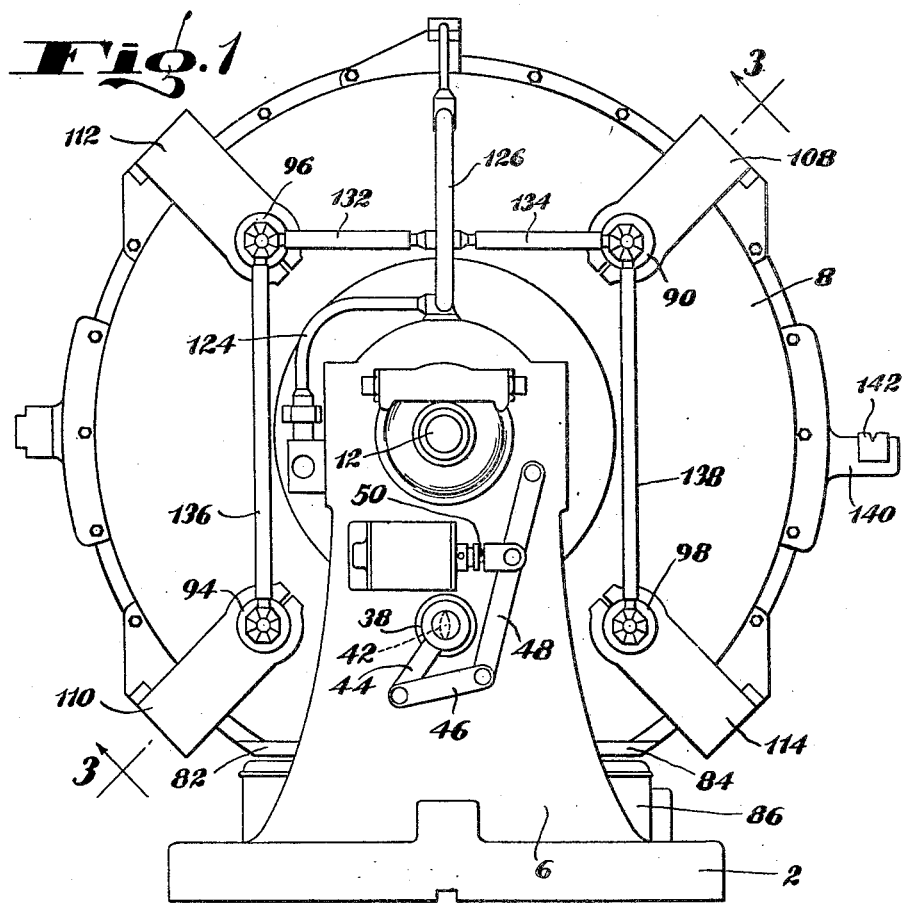
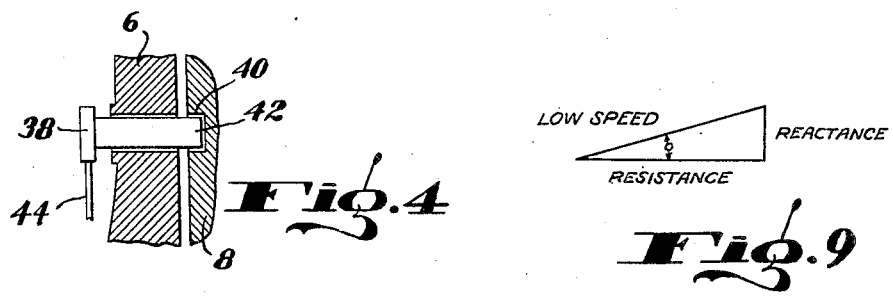
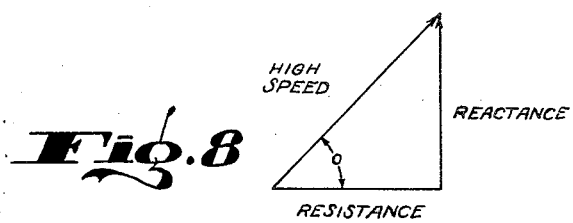

2,373,262

UNITED STATES PATENT OFFICE 2,373,262

DYNAMOMETER

Augustus R. Rogowski, Needham, Mass.

Original application June 6, 1941, Serial No. 396,828. Divided and this application December 26, 1941, Serial No. 424,427

7 Claims. (Cl. 188—104)

This application is a division of the application of Augustus R. Rogowski, Serial No. 396,828, filed June 6, 1941, for Dynamometer and method of designing same, Patent No. 2,298,725, October 13, 1942.

This invention relates to electromagnetic power absorption devices using the eddy current principle. The invention may be used specifically in connection with electromagnetic dynamometers and brakes and other devices of similar character.

The invention of this application is primarily concerned with the construction of an eddy current power absoprtion device which will provide a torque curve of a shape suitable for meeting the conditions of use to which the machine will be put. The invention further includes the incorporation of the parts that may be designed according to the method of the above-referred to Rogowski application.

Previous electromagnetic dynamometers and power absorption devices using the eddy current principle have often suffered from speed instability when used with prime movers having relatively constant torque-speed characteristics, usually due to the fact that the absorption torque of the dynamometer did not cross the output torque of the prime mover at such an angle that increasing R. P. M. resulted in a dynamometer torque greater than the prime mover torque. This disparity often occurred over a large portion of the operating speed range, necessitating the action of complicated and expensive auxiliary equipment such as exciters, electronic field controls, and the like, if anything like suitable results were to be obtained.

By the present invention, it has been found that in the simple type of dynamometer or eddy brake comprising a disk of nonmagnetic conducting material rotating between one or more pairs of magnetic poles, the rotative speed at which the maximum torque occurs may be shifted to higher or lower speeds, as desired, by substituting materials of higher or lower electrical resistivity.

Therefore, the present invention contemplates the particular design of the device when made in accordance with the method of the parent application.

An additional feature of the invention resides in the provision of a standardized dynamometer structure, in which the rotor may be changed at will from one material to another whereby the revolutions per minute at which the maximum torque is produced may be varied to meet the requirement of varying prime movers with which it is to be used.

These and other objects of the invention will become more apparent as the description proceeds with the aid of the accompanying drawings, in which:

Fig. 1 is a side elevation of an electromagnetic dynamometer incorporating the invention.

Fig. 2 is an end elevation of the machine shown in Fig. 1 looking from the right.

Fig. 3 is a section on the line 3—3 of Fig. 1.

Fig. 4 is a side elevational detail of the housing locking mechanism.

Fig. 5 shows some of the torque curves that may be produced as a result of the invention.

Fig. 6 shows the nature of the eddy currents at low speed.

Fig. 7 shows the displacement of the eddy currents at high speed.

Figs. 8 and 9 show the low and high speed vector diagrams.

Figure 10:
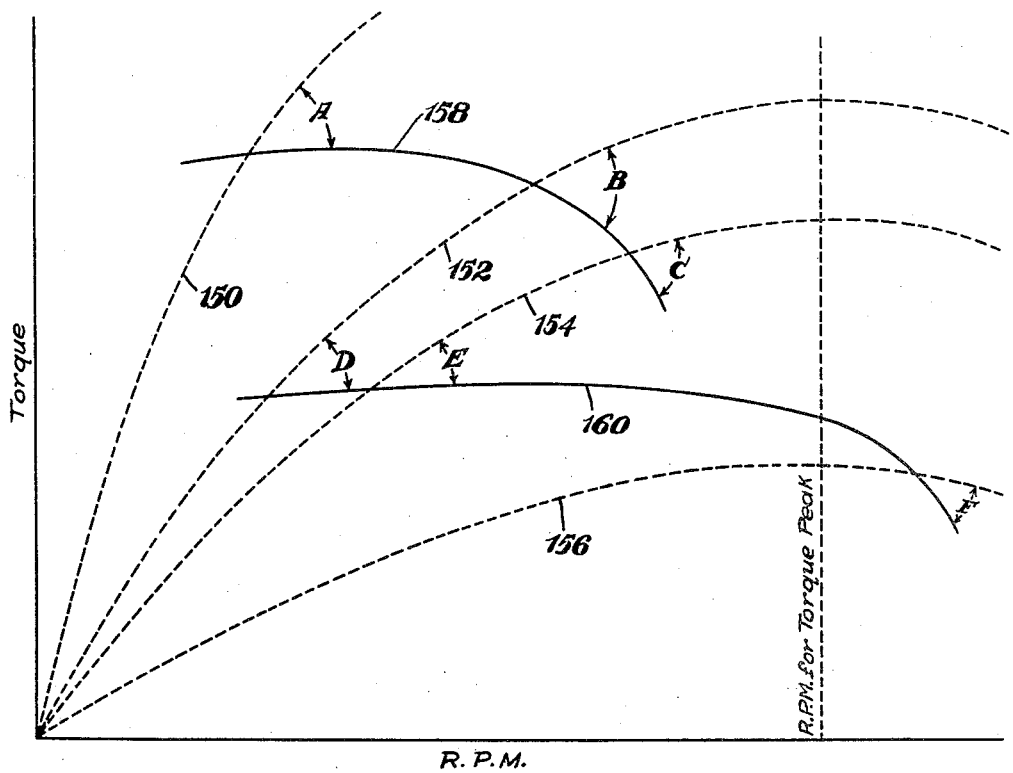
Fig. 10 illustrates the manner in which the torque curve of a dynamometer using a rotor of selected material may be varied by altering the number of magnets, the strength of the field current, or both.

Referring now to Figs. 1 to 4, a preferred form of electromagnetic dynamometer using the invention is shown. This consists of a base 2 having upwardly extending spaced supports 4 and 6 which carry a housing 8 within which is mounted a rotor 10 carried by a shaft 12 which may be connected in any suitable manner to a prime mover.

The details of this construction are as follows.

Referring to Fig. 3, which is a section on the line 3—3 of Fig. 1, the supports 4 and 6 have mounted within bearing races 14 and 18 respectively. The housing 8 has centrally extending flanges 22 and 24 which carry bearing races 26 and 30 respectively, corresponding to the support races 14 and 18. Between these races are mounted a plurality of ball bearings 34 and 36. From this construction, it is clear that the housing 8 is supported for rotative movement with respect to supports 4 and 6.

Rotation of the housing with respect to the supports, however, is limited by means of a locking device 38, shown in Figs. 1, 2, and 4. This locking device may take any desired form, but in the construction shown, the housing 8 has a suitable recess 40 in its side into which extends a key 42, generally elliptical in shape, as shown in Fig. 1. Key 42 is mounted in support 6 for limited rotative movement under the control of a lever 44, connected link 46 and lever 48. Movement of lever 48 is in turn controlled by a piston 50 operated in any suitable manner.

As can be seen from Fig. 1, movement of lever 48 to the right will result in rotating key 42 to the left approximately 90°. By adjusting the dimensions of key 42 with respect to recess 40, movement of housing 8 through a limited angle will be permitted when the key is in vertical position, while movement of housing 8 will be eliminated or greatly reduced when the key is in horizontal position. The purpose of the locking device will become more apparent hereafter.

Flanges 22 and 24, that carry the inner ball races 26 and 30, are continued inwardly to form the hubs 52 and 54 which carry outer ball races 56 and 58, while mounted in a corresponding position on shaft 12 are ball races 60 and 62. Between these two sets of ball races are a plurality of ball bearings 64 and 66. Housing 8 is in turn carried by hubs 52 and 54.

At the center of shaft 12 and fixed thereto are a pair of disks 68 and 70 adapted to secure therebetween a larger disk 72, all of which together constitutes the rotor.

From the description thus far, it will be seen that shaft 12, carrying rotor 72, may revolve within the confines of housing 8, and housing 8 in turn is free to move a limited amount in supports 4 and 6, depending upon the setting of key 42.

Housing 8 may be formed in any desired manner, but in the present construction comprises two halves 74 and 76 with circumferentially extending flanges 78 and 80 which may be bolted together as shown in Fig. 2. The housing is closed all the way about its circumference except for a limited distance at the bottom between the points numbered 82 and 84 (see Fig. 1). This construction permits the introduction of cooling water on the rotor through jets or other suitable means and at the same time causes retention thereof in the space within the housing at the outer circumference of the rotor. The water may drain from the housing at the bottom into a sump 86, from which it may be drawn, cooled and recirculated or permitted to drain away as waste.

Housing 8 has positioned within and spaced radially thereabout a plurality of electromagnetic poles formed by a series of cores, two pairs of which are shown in section in Fig. 3 as 88 and 90 and 92 and 94. Altogether there are four pairs of cores, as may be seen in Fig. 1, the other two pairs being numbered 96 and 98.

About each of these cores is wound a coil, four of which are shown in Fig. 3 in section at 100, 102, 104 and 106. There are corresponding coils wound about the other two pair of cores 96 and 98. The inner ends of the several cores are located close to the rotor 72, near the rim thereof.

Each pair of cores is connected by magnets 108, 110, 112 and 114, so that when the several coils are excited by the application of current thereto, a series of magnetic fields will be set up through which the rotor 72 may be moved.

In order to prevent the rotor and cores from becoming unduly heated during operation, cooling means has been provided. All of the cores are hollow, as illustrated at 116, 118, 120 and 122 in Fig. 3, so that water may be introduced therethrough to impinge directly upon the rotor.

Water is supplied to the hollow cores by any convenient source of water under pressure which may be lead in through pipe 124 to pipe 126, thence to pipes 128 and 130, and finally to pipes 132, 134, 136, 138, feeding the cores on one side, and to a corresponding set of pipes feeding the cores on the other side.

Water flowing through the core passages impinges against the opposite surfaces of the rotor rim, to be flung outwardly under centrifugal force as the rotor revolves, from whence it will drain down into sump 86. The volume and the temperature of the cooling water may be adjusted to keep the rotor at any desired temperature.

On one side of the housing 8 is a short lug 140, having an insert 142 adapted to receive a knife edge connected to any suitable scale, which may measure the rotative effect applied to housing 8 through the rotation of rotor 72. Thus, in Fig. 1, if the rotor be rotated counterclockwise through the magnetic fields of the several electromagnets, the housing will tend to turn to the left. If key 42 has been swung to horizontal position so that the housing is unlocked, permitting limited movement of housing 8, the rotative force may then be measured by the scale restraining lug 140.

A further aspect of the invention resides in the methods of determining the particular material of which rotor 72 may be made to produce torque curves of predetermined characteristics. Obviously, the torque curve produced by a rotor of given material will vary if the physical dimensions are changed or if the magnetic fields are varied. However, if a dynamometer of fixed dimensions and a magnetic field of fixed strength are assumed, then from the method of the present invention it is possible to determine the material of which the rotor may be made to produce a torque curve of desired characteristics. Thus, the rotor, of fixed dimensions, in this case 18 inches in diameter, operating between 1¾ inch pole pieces, produces torque curves of varying characteristics, as shown in Fig. 5, determined by the material of which the rotor is made. From the following table, the relationship of the electrical resistivity of illustrative materials to revolutions per minute to produce maximum torque may be seen.

| Material | Electrical resistivity | R. P. M. for maximum torque |
|---|---|---|
| Copper | 1.7 | 185 |
| Duralumin | 5.8 | 630 |
| Bronze | 12 | 1,300 |
| Monel | 42 | 4,560 |
| Stainless steel | 69 | 7,500 |
| Nichrome | 100 | 10,900 |

It will be observed that the peak of the torque curve in revolutions per minute is almost directly proportional to the corresponding electrical resistivity. Thus, if it were desired that the present dynamometer produce a torque curve which would have a peak at 3,000 R. P. M., the rotor should be made of a material having a resistivity of approximately 27.6, whereas if a torque curve showing a maximum torque at 6,000 R. P. M. were desired, the rotor should be made of material having a resistivity of approximately 55. It will be observed from Fig. 5 that all of the curves follow a substantially uniformly changing contour, so that power output at revolution speeds less than maximum are likewise proportional to the resistivity of the material used. A substantially straight line curve has been found to exist between the electrical resistivity of the metal used and the revolutions per minute at which maximum torque is produced, if the other factors of the dynamometer remain unvaried.

As a result of this invention, it is now possible to produce an electromagnetic dynamometer or brake which will provide a torque curve which reaches a maximum, at any desired number of revolutions per minute through the variation of the rotor material without otherwise changing the dynamometer construction.

For example, if it is desired to measure the power output of an engine through its various speed ranges, a rotor may be selected which will provide maximum torque at some R. P. M. above the speed range under consideration, or at such an R. P. M. that the dynamometer torque curve has a steeper slope than that of the engine, at all points within the required speed range.

In many cases, the maximum torque that may be absorbed by any given dynamometer will not sufficiently approximate the maximum torque that may be produced by the prime mover to be tested, with the result that such dynamometer cannot be used.

The invention therefore also includes the method of adjusting a dynamometer in such manner that the torque absorbing capacity may be increased or decreased while the R. P. M. at maximum torque absorbing capacity remains constant. This phase of the invention is illustrated in Fig. 10. This diagram is illustrative of a dynamometer of fixed dimensions using a rotor of selected material. The four torque curves, numbered 150, 152, 154 and 156, all reach their maximum torque at substantially the same number of R. P. M. The torque curve 150 is produced through the utilization of a large number of magnets and a high field current. By reducing the number of magnets, but still using a high field current, a curve such as 152 will be produced. If, on the other hand, the number of magnets remained the same, as in the case of curve 150, and a low field current were used therewith, then a curve such as 154 would be produced.

Finally, if the number of magnets used is reduced and a low field current used therewith, a curve such as 156 will result. However, in all instances it will be noted that the dynamometer will reach maximum torque at approximately the same number of R. P. M.

Superimposed on curves 150, 152, 154, and 156 are typical torque curves of engines to be tested, numbered 158 and 160. These curves intersect with the torque curves to form the angles A. B. C., D, E and F. In each case it will be noted that the angle so formed is positive. That is to say, the torque curve of the dynamometer will cross that of the engine to be tested, thus keeping the latter under control throughout the required speed range.

From Fig. 10 it is believed apparent that suitable adjustments to the number of magnets and field current may be made to any dynamometer using a rotor of selected material, so that a resulting torque curve may be produced which will be adequate to match the power output characteristics of the prime mover to be tested.

Accordingly, the power absorption capacity may be adjusted by varying the number or strength of the magnetic fields acting on the outer area of the rotor, while the R. P. M. at which maximum torque appears may be controlled in accordance with the electrical resistivity of the rotor material.

To change the torque absorbing capacity of the dynamometer without varying the R. P. M. at which maximum torque is produced, the electromagnetic field strength may be varied in accordance with the ratios of the square roots of the present torque and the torque desired.

The power absorption capacity and the speeds at which corresponding maximum torque is found may, of course, be otherwise varied by changing the dimensions of the machine and varying the field strength of the electromagnets so that the dynamometer may be additionally adjusted or altered to meet the conditions of practically any prime mover as to its power output and maximum speed.

The materials listed are illustrative only. Obviously it is possible to prepare alloys or to assemble rotors of different materials which will have resistivities corresponding to any desired figure.

In some instances it might be found desirable to make the rotor of magnetic, rather than non-magnetic, materials, in which case the R. P. M. for maximum torque will vary directly with resistivity and inversely with permeability. However, when using magnetic materials, an exact prediction is difficult because permeability varies with the flux density and flux leakage varies in turn with the permeability. In the case of the use of non-magnetic materials, as heretofore described, these conditions are not present and more exact predictions are therefore possible.

I claim:

1. A dynamometer comprising a housing, a plurality of pairs of electromagnets having cores mounted in opposed relation on said housing, a passage extending longitudinally of each of said cores, a shaft mounted for rotation within said housing, a rotor mounted on said shaft with its outer portion located to rotate between said pairs of electromagnets, and fluid supplying means connected to said passages whereby fluid may be caused to flow through said cores to impinge on opposite sides of said rotor.

2. A dynamometer as set forth in claim 1, having means for withdrawing fluid from said housing after it has been used to cool said rotor.

3. A dynamometer comprising a pair of spaced supports, a housing rotatably mounted on said supports, means for preventing rotation of said housing while at the same time permitting as much angular movement as is necessary in making torque measurements, a shaft rotatably mounted in said housing, a rotor mounted on said shaft within said housing, a plurality of pairs of electromagnets located within said housing and oppositely disposed with respect to the outer portion of said rotor, said electromagnets including cores with passages extending therethrough terminating in proximity to said rotor, means for introducing liquid to said passages whereby said liquid may be caused to impinge on both sides of the outer portion of said rotor to cool the latter, and means for removing liquid from said housing.

4. A dynamometer as set forth in claim 3, in which the means for removing liquid from said housing comprises an opening in the lower portion of said housing through which said liquid may drain.

5. A dynamometer comprising a pair of spaced supports, a housing rotatably mounted on said supports, means for restraining said housing against rotation while permitting limited oscillation, a shaft rotatably mounted in said housing, a disk rotor of known non-magnetic conducting material of selected electrical resistivity mounted on said shaft, a plurality of pairs of electromagnets mounted within said housing, said pairs of electromagnets straddling the outer portion of said rotor, passageways through said electromagnets by which cooling fluid may be directed against rotor, said rotor being one of a group of rotors of substantially uniform dimensions which may be used with said dynamometer and in which the electrical resistivity of each rotor bears substantially the same ratio to the number of revolutions per minute it must be rotated in said dynamometer to develop maximum torque.

6. A dynamometer comprising a housing, a plurality of pairs of electromagnets mounted in opposed relation on said housing, passageways through said electromagnets through which cooling fluid may be passed, a shaft mounted for rotation within said housing, a rotor mounted on said shaft with its outer portion located to rotate between said pairs of electromagnets, said rotor being one of a group of rotors of substantially uniform dimensions which may be used with said dynamometer and in which the electrical resistivity of each rotor bears substantially the same ratio to the number of revolutions per minute it must be rotated in said dynamometer to develop maximum torque.

7. A dynamometer comprising a pair of spaced supports, a housing rotatably mounted on said supports, means for preventing rotation of said housing while at the same time permitting as much angular movement as is necessary in making torque measurements, a shaft rotatably mounted in said housing, a disk rotor of known nonmagnetic conducting material of selected electrical resistivity mounted on said shaft, a plurality of pairs of electromagnets mounted within said housing, said pairs of electromagnets straddling the outer portion of said rotor, each electromagnet having a core with a passage therethrough whereby cooling liquid may be introduced to impinge on opposite sides of said rotor, means for supplying cooling liquid to said passages, means for removing used cooling liquid from said casing, said rotor being one of a group of rotors which may be used with said dynamometer and in which the electrical resistivity of each rotor bears substantially the same ratio to the number of revolutions per minute each rotor must be rotated in said dynamometer to develop maximum torque.

AUGUSTUS R. ROGOWSKI.